Sept. 23, 1958     H. E. W. WEST     2,852,911
STARTING AND IGNITION SYSTEMS FOR GAS TURBINE ENGINES
Filed Dec. 2, 1953     2 Sheets-Sheet 1
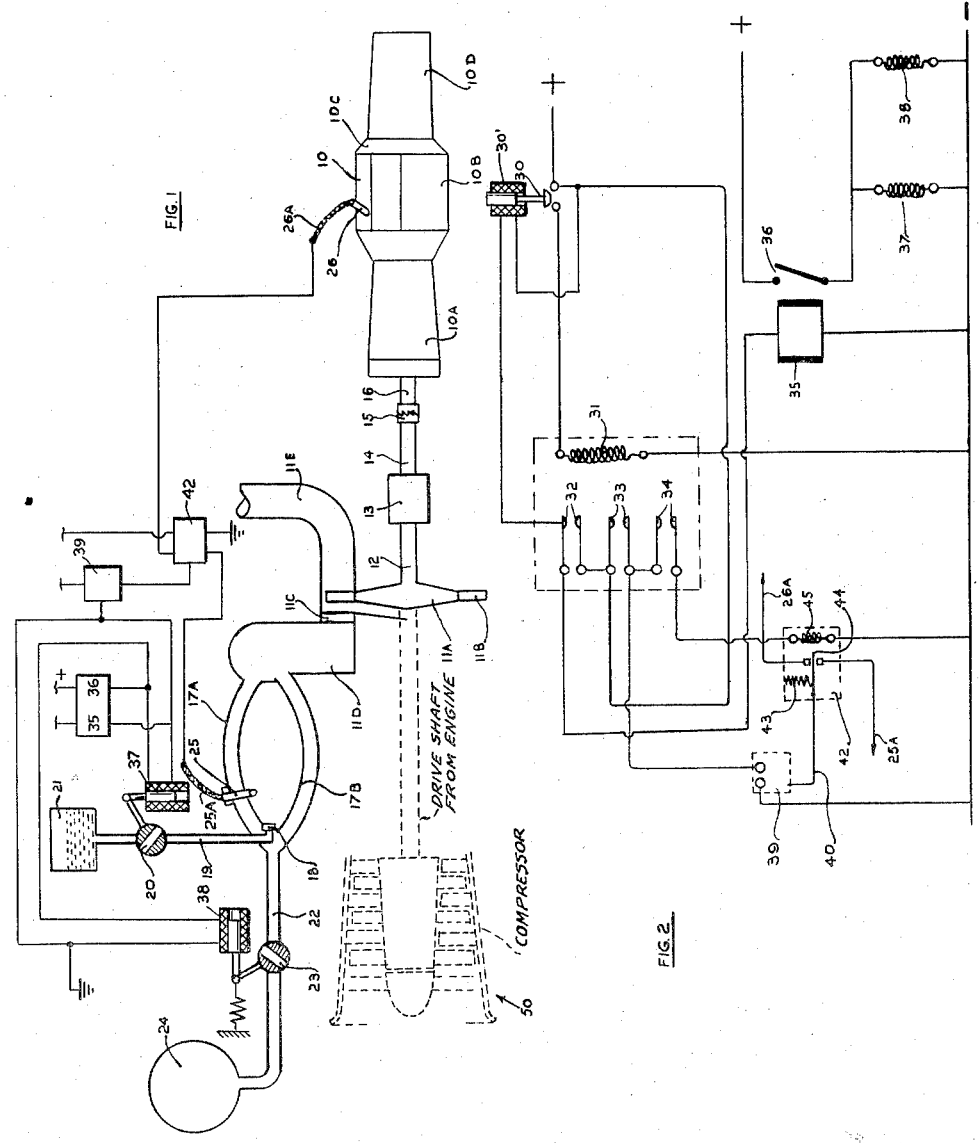
Inventor
Harold Edward William West
By Leash and Radue
Attorney United States Patent Office 2,852,911
Patented Sept. 23, 1958

2,852,911

STARTING AND IGNITION SYSTEMS FOR GAS TURBINE ENGINES

Harold Edward William West, Allestree, England, assignor to Rolls-Royce Limited, Derby, England, a British company Application December 2, 1953, Serial No. 395,693

Claims priority, application Great Britain December 12, 1952

8 Claims. (Cl. 60—39.14)

This invention relates to starting and ignition systems for gas turbine engines of the type which include a compressor, combustion equipment connected to receive air from said compressor and a turbine connected to receive combustion products from the combustion chamber and connected to the compressor to drive it. A system of starting such engines has been proposed in which an auxiliary starter turbine is coupled during starting of the gas turbine engine to rotate a compressor/turbine system of the latter, said auxiliary starter turbine being fed with combustion products under pressure from a combustion chamber.

Such combustion chamber may form part of an auxiliary gas turbine engine comprising a compressor system drawing air from atmosphere and delivering it to the combustion chamber into which fuel, conveniently liquid fuel, is introduced. Alternatively to drawing air from the atmosphere the combustion chamber may be supplied with an oxidant which again may be air under pressure from a reservoir source.

The present invention is more particularly concerned with ignition and control systems suitable for use with such hitherto proposed starting systems.

According to the present invention in a starter system for a gas turbine engine of the said kind there is provided an ignition system having first electrical igniter means in said auxiliary combustion chamber and second electrical igniter means in said combustion equipment of said gas turbine engine, a source of electrical energy connected to supply selectively both said igniter means, and switching means for disconnecting said source from said first igniter means and connecting it to said second igniter means automatically after combustion of said fuel and oxidant has been established in said auxiliary combustion chamber.

Preferably the means for transferring the source from the first to the second igniter means includes a time control device, the operation of which is initiated by manual-control means.

Alternatively the changeover may be effected by centrifugally operated means sensitive to the running speed of the starter engine or by a thermally operated switch actuated when a predetermined temperature is reached in said auxiliary combustion chamber.

According to a feature of the invention a starter system for gas turbine engines includes means for automatically controlling the supply of fuel to the said auxiliary combustion chamber. Such automatic control means may also control the supply of oxidant to the said combustion chamber.

Conveniently such automatic control is effected by the control means associated with the transfer of the electrical supply source from the first to the second electrical igniter means.

By means of this invention it is possible to provide a starter system for a gas turbine engine having an electrical relay system which when put into motion by manual means performs automatically the starting of the auxiliary starter turbine, the starting of the gas turbine engine, the control of the fuel supply to the auxiliary turbine and the connection of a single source of electrical energy in sequence first to igniter means of the auxiliary turbine and then to igniter means of the gas turbine engine.

A preferred embodiment of the invention is illustrated in the accompanying diagrammatic drawing in which:

Figure 1 illustrates a hitherto-proposed starting system for a gas turbine engine;

Figure 2 shows an electrical circuit suitable for use with such a system;

Figure 2A:
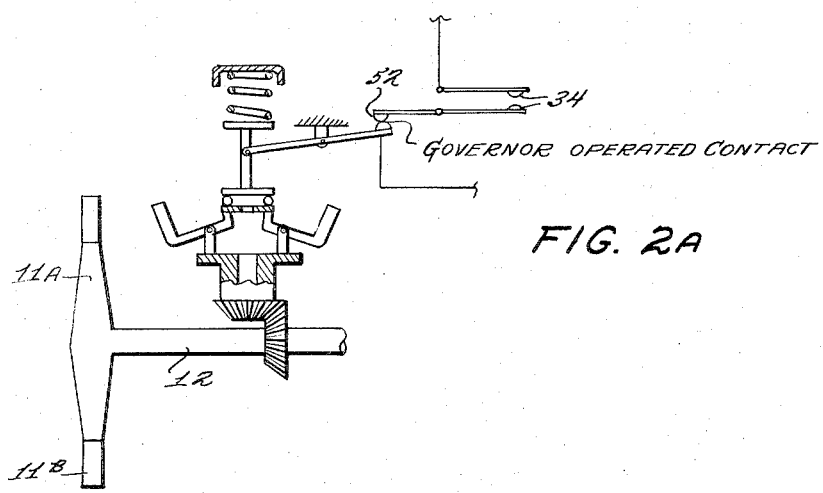
Figure 2A illustrates a centrifugally operated contact set for optional use with the circuit of Fig. 2.

Referring to Figure 1 the gas turbine engine to be started is illustrated at 10 comprising a compressor system 10A delivering air to combustion equipment 10B, from which the products of combustion pass to the turbine 10C exhausting to atmosphere through exhaust duct 10D. The engine is for example suitable for reaction propulsion of aircraft, the exhaust gases emerging from the exhaust 10D at high velocity.

The compressor system 10A and turbine system 10C comprise a rotor shaft which when the engine is being started is rotated by an auxiliary starter turbine, including a turbine disc 11A, turbine rotor blading 11B, turbine stator blading 11C, turbine inlet volute 11D, and turbine exhaust ducting 11E. The disc 11A is carried on a rotor shaft 12 which connects through reduction gear 13 to output shaft 14 and suitable engaging mechanism indicated by clutch 15 to the gas turbine engine compressor shaft 16.

The turbine inlet volute 11D is fed with combustion products from a combustion chamber comprising an outer air casing 17A and inner flame tube 17B. Liquid fuel is introduced into the combustion chamber by an atomising nozzle 18 through supply pipe 19 and spring-closed control valve 20 from a pressurised reservoir 21. Air is introduced into the combustion chamber through inlet pipe 22 and spring-closed control valve 23 from a pressure reservoir 24. First electrical igniter means 25 fed through electrical lead 25A serves to ignite the fuel/air mixture in the combustion chamber supplying the auxiliary starter turbine, whilst second electrical igniter means 26 fed through electrical lead 26A serves to ignite fuel in the combustion equipment 10B of the gas turbine engine.

The present invention is more particularly concerned with an ignition and control system for such a starter system of a gas turbine engine.

Figure 3:
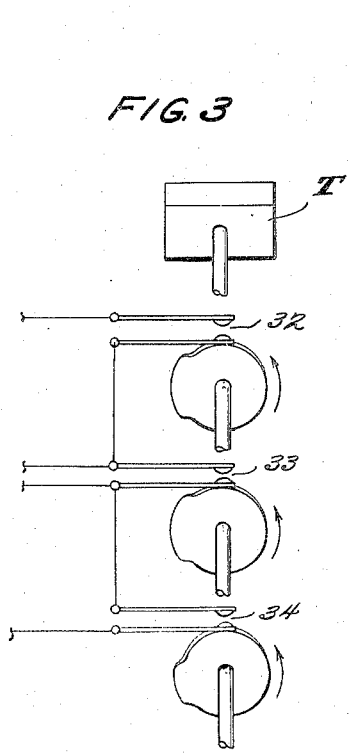
Figure 3 is a detailed showing of the timing mechanism and cams for operating the contacts of Fig. 2.

Referring now to Figure 2 an electrical supply source, for example a battery, is connected across leads marked "+" and "—." A manual push-button control switch is indicated at 30, closure of which energises a relay coil 31 which sets a rotary time control mechanism such as electric motor T shown in Fig. 3 as having a cam shaft and three cams actuating contacts 32, 33 and 34. The setting of the rotary time control mechanism initially closes the contacts 32, 33 and 34, and energizes holding magnet 30' permitting the release of manual pressure applied to the switch 30. Closure of contacts 32 energises relay 35 causing closure of contacts 36, thereby energising solenoids 37 and 38. These solenoids open, when energised, the valves 20 and 23 (Figure 1), these valves being spring-loaded in the sense of closure, as shown. In this manner fuel and air are supplied to the combustion chamber.

The setting of the rotary time control mechanism also closes contacts 33, whereby electrical power is supplied from the battery to high energy ignition supply apparatus 39 the output from which feeds through the lead 40 to a high tension switching relay 42. The armature 44 of this relay is normally biased by a spring 43 to make on a contact connected to electrical lead 26A, i. e., that feeding the second electrical igniter means 26 (see Figure 1). The setting of the rotary time control mechanism also closes the contacts 34 which through contacts 33 energises relay coil 45 causing the armature 44 to connect ignition output lead 40 to the electrical lead 25A, i. e. that associated with the first electrical ignition means 25.

Thus on setting of the rotary time control mechanism the first electrical igniter means 25 is fed with energy from the apparatus 39 causing ignition of the fuel in the combustion chamber. The combustion products thus drive the auxiliary starter turbine and cause rotation of the turbine/compressor rotor of the main engine.

The rotary time control mechanism after being set in operation rotates the cam device at controlled speed and is arranged after a predetermined time to allow the contacts 34 to open thus de-energizing the relay coil 45 whereby the second electrical igniter means 26 is fed from the apparatus 39. In starting of the main engine fuel is supplied to the combustion equipment 10B and this is ignited by the electrical igniter means 26.

After a further predetermined time the cam device of the rotary time control mechanism allows contacts 32 and 33 to open whereby relay coil 35 is de-energized, opening contacts 36 and thereby de-energizing solenoids 37 and 38. The valves 20 and 23 thus close, shutting off the fuel and air supplies to the combustion chamber of the auxiliary starter turbine. Additionally the opening of contacts 33 discontinues the electrical supply source to the high energy ignition supply apparatus 39.

Where in alternative arrangements the auxiliary starter turbine drives a compressor system such as shown in dotted lines at 50 in Fig. 1 feeding the combustion chamber with compressed air the reservoir 24 and control valve 23 will be omitted together with the solenoid 38.

Where, however, such an auxiliary gas turbine engine is started by an electric motor, such motor can be connected in the circuit in place of solenoid 38 in an obvious manner.

Whilst in the above embodiment the transfer of the high energy ignition supply from the first to second electrical igniter means is effected by means of a time control, alternative arrangements may be adopted. For example a centrifugally-operated switch such as shown in Fig. 2A is sensitive to the running speed of the auxiliary turbine and may be driven from turbine 11B and arranged at a predetermined speed of rotation of the turbine to open a pair of contacts 52 in series with contacts 34 and so de-energize relay coil 45 and connect ignition output lead 40 to the lead 26A associated with the second electrical ignition means 26.

Figure 2B:
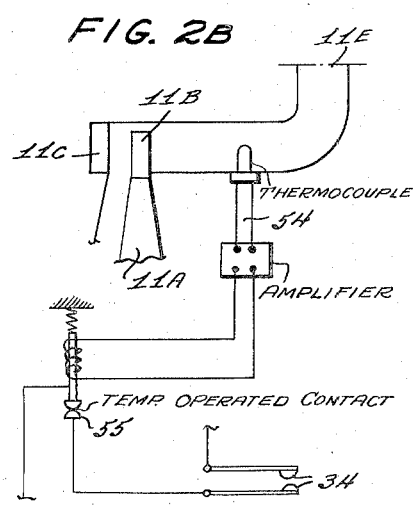
Fig. 2B illustrates a thermally operated contact set for optional use with the circuit of Fig. 2.

Alternatively, or in addition, a temperature-sensitive device 54, Fig. 2B, may be located in the exhaust duct 11E of the auxiliary turbine and arranged at a predetermined temperature of the exhaust gas from the turbine 11B to open a pair of contacts 55 in series with contacts 34 to de-energize the relay coil 45.

When the centrifugally-operated switch or temperature-sensitive switch, or both are provided it is preferred that the normal rotary time control mechanism should still function as before described to control the opening of the contacts 32, 33 and 34, but the cam lobes may be of greater extent.

An overspeed device consisting of a centrifugally-operated switch driven by the auxiliary turbine 11B may be provided to shut down the auxiliary turbine on attainment of a preselected speed. This switch may be incorporated in the device of Fig. 2A in an obvious manner and arranged to open a pair of contacts in the lead from the positive terminal of the battery to the contacts 33.

What I claim is:

1. A starter system for a gas turbine engine including a compressor, combustion equipment connected to receive air from said compressor and a turbine connected to receive combustion products from the combustion chamber and connected to the compressor to drive it, of the kind in which an auxiliary starter turbine is coupled during starting to rotate a compressor/turbine rotor of the gas turbine engine, and which includes an auxiliary combustion chamber supplied with fuel and oxidant from which said auxiliary turbine is supplied with combustion products under pressure; comprising in combination, an ignition system having first electrical igniter means in said auxiliary combustion chamber and second electrical igniter means in said combustion equipment of said gas turbine engine, a source of high voltage electrical energy connected to supply selectively both said igniter means, switching means for disconnecting said source from said first igniter means and connecting it to said second igniter means after combustion of said fuel and oxidant has been established in said auxiliary combustion chamber, and means responsive to a predetermined condition of operation of said auxiliary starter turbine for actuating said switching means.

2. A starter system as claimed in claim 1 which includes time delay means for automatically controlling the supply of fuel to the said auxiliary combustion chamber.

3. A starter system as claimed in claim 1 which includes time delay means for automatically controlling the supply of fuel and the supply of oxidant to the said auxiliary combustion chamber.

4. A starter system as claimed in claim 1 which includes means for automatically controlling the supply of fuel and the supply of oxidant to the said auxiliary combustion chamber, said means being effected by means associated with the means effecting the transfer of the electrical supply source from the first to the second electrical igniter means.

5. A starter system as claimed in claim 1 in which the means which effect a change over from the first igniter means to the second igniter means is a rotary time control mechanism.

6. A starter system as claimed in claim 1 in which the means which effect a change over from said first to said second igniter means comprise a time delay device and serially connected therewith a centrifugally operated switch sensitive to the running speed of the auxiliary starter turbine.

7. A starter system as claimed in claim 1 in which said means which effect a change over from said first to said second igniter means comprises a thermally operated switch actuated when a pre-determined temperature is reached by the products of combustion from said auxiliary combustion chamber.

8. A starter system for a gas turbine engine including a compressor, combustion equipment connected to receive air from said compressor and a turbine connected to receive combustion products from the combustion chamber and connected to the compressor to drive it, of the kind in which an auxiliary starter turbine is coupled during starting to rotate a compressor/turbine rotor of the gas turbine engine, and which includes an auxiliary combustion chamber from which said auxiliary turbine is supplied with combustion products under pressure, comprising valves controlling the supply of fuel and the supply of oxidant to said auxiliary combustion chamber and spring means normally holding said valves closed, an ignition system having first electrical igniter means in said auxiliary combustion chamber and second electrical igniter means in said combustion equipment of said gas turbine engine, a high energy ignition supply apparatus, a source of electrical energy supplied to the said apparatus, a changeover switch to connect selectively said apparatus to said first and said second igniter means, spring means normally holding said switch in the position in which said high energy ignition supply apparatus is connected to said second igniter means, a first relay associated with said changeover switch and operative when energized to hold said switch in a position in which said high energy ignition supply apparatus is connected to said first igniter means, a manual switch, a second relay operated on closure of said manual switch, switches adapted to be closed by operation of said second relay to connect the high energy ignition supply apparatus to the source of electrical energy and to energize the first relay associated with the changeover switch, solenoids connected to said fuel and oxidant valves and also actuated by operation of said second relay to open the fuel and oxidant valves, and delayed action means operative after an interval of time first to de-energize the first relay associated with said changeover switch so as to connect the said high energy ignition apparatus to said second igniter means and operative after a longer interval of time to de-energize the solenoids holding open the said fuel and oxidant valves and to cut off the supply of energy to the said high energy ignition supply apparatus.

References Cited in the file of this patent

UNITED STATES PATENTS

| | | |
|---|---|---|
| 2,397,659 | Goddard | Apr. 2, 1946 |
| 2,443,648 | Austin et al. | June 22, 1948 |
| 2,611,239 | Briggs | Sept. 23, 1952 |
| 2,643,511 | Briggs | June 30, 1953 |
| 2,667,742 | Kuzmitz | Feb. 2, 1954 |
| 2,677,930 | Carr | May 11, 1954 |